United States Patent
Geilfuss et al.

(10) Patent No.: US 11,016,760 B2
(45) Date of Patent: *May 25, 2021

(54) METHOD AND APPARATUS FOR ENABLING AN APPLICATION TO DETECT SPECIFIED CIRCUMSTANCES

(71) Applicant: Factual Inc., Los Angeles, CA (US)

(72) Inventors: Bradley Geilfuss, Los Angles, CA (US); Chris Bleakley, Los Angles, CA (US); Arthur Wolf, Los Angles, CA (US); Evan Gamble, Los Angles, CA (US); Wesley Henderson, Los Angles, CA (US); Chen Guo, Los Angles, CA (US); Yajia Yang, Los Angles, CA (US); Boris Shimanovsky, Los Angles, CA (US)

(73) Assignee: Factual Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/684,484

(22) Filed: Nov. 14, 2019

(65) Prior Publication Data

US 2020/0081710 A1    Mar. 12, 2020

Related U.S. Application Data

(63) Continuation of application No. 15/368,455, filed on Dec. 2, 2016, now Pat. No. 10,509,645.

(51) Int. Cl.
| | |
|---|---|
| *G06F 8/71* | (2018.01) |
| *H04W 4/02* | (2018.01) |
| *H04L 29/08* | (2006.01) |
| *G06F 8/65* | (2018.01) |
| *G06Q 30/02* | (2012.01) |

(52) U.S. Cl.
CPC ............... *G06F 8/71* (2013.01); *G06F 8/65* (2013.01); *G06Q 30/0225* (2013.01); *G06Q 30/0254* (2013.01); *G06Q 30/0255* (2013.01); *H04L 67/12* (2013.01); *H04L 67/22* (2013.01);
(Continued)

(58) Field of Classification Search
CPC .......... H04W 4/02–027; H04W 4/029; H04W 8/08–245; H04W 48/04; H04W 4/50; H04W 4/027; H04W 4/025; H04W 4/023; H04W 52/0254; G06Q 30/0251; G06Q 30/0252; G06Q 30/0254; G06Q 30/0255; G06Q 30/0259–0267; G06Q 30/0224; G06F 8/30; G06F 8/71; G06F 8/65; G06F 9/445; H04L 67/125; H04L 67/12; H04L 67/22; H04L 67/34
USPC ....... 455/456.1–457; 705/14.49, 14.5, 14.57, 705/14.58, 14.61–14.67
See application file for complete search history.

(56) References Cited

U.S. PATENT DOCUMENTS

| | | |
|---|---|---|
| 2010/0137003 A1 | 6/2010 | Goldfarb |
| 2012/0296686 A1 | 11/2012 | Fugman et al. |

(Continued)

*Primary Examiner* — Allahyar Kasraian

(57) ABSTRACT

Methods and systems are provided that may be utilized to detect occurrence of one or more specified circumstances. A determination may be made as to whether one or more specified circumstances are detected such as responsive to one or more user actions or an occurrence of an event unrelated to a user. One or more binary digital signals may be generated to store a detection of one or more specified user circumstances in a log or memory at least partially in response to detection of the one or more specified circumstances.

20 Claims, 4 Drawing Sheets

(52) U.S. Cl.
CPC ............ *H04L 67/34* (2013.01); *H04W 4/027* (2013.01); *H04M 2250/12* (2013.01)

(56) References Cited

U.S. PATENT DOCUMENTS

| | | |
|---|---|---|
| 2015/0031326 A1 | 1/2015 | Begin et al. |
| 2015/0066742 A1* | 3/2015 | Chatterton .............. H04W 4/33 705/39 |
| 2015/0128058 A1* | 5/2015 | Anajwala ............... G06Q 10/10 715/739 |
| 2015/0248284 A1 | 9/2015 | Poiesz et al. |
| 2015/0330805 A1 | 11/2015 | Cho et al. |
| 2015/0373565 A1 | 12/2015 | Safavi |
| 2016/0360382 A1* | 12/2016 | Gross ...................... G06F 9/445 |
| 2017/0063606 A1 | 3/2017 | Babu |
| 2017/0064073 A1* | 3/2017 | Spencer ................ H04W 4/023 |
| 2017/0140285 A1* | 5/2017 | Dotan-Cohen ........... G06F 3/01 |
| 2017/0364675 A1 | 12/2017 | Vilke et al. |
| 2018/0040004 A1* | 2/2018 | Greenberger ........... H04L 67/22 |

* cited by examiner

METHOD AND APPARATUS FOR ENABLING AN APPLICATION TO DETECT SPECIFIED CIRCUMSTANCES

CROSS-REFERENCE TO RELATED APPLICATION

This application is a continuation of U.S. patent application Ser. No. 15/368,455, filed Dec. 2, 2016, issued as U.S. Pat. No. 10,509,645, the disclosure of which is hereby incorporated by reference in its entirety.

BACKGROUND

1. Field

The subject matter disclosed herein relates to a method, system, or apparatus for enabling an application to detect circumstances for a user of a mobile device.

2. Information

There is a wealth of information collected from users of mobile devices, e.g., on a daily basis. For example, a mobile device, such as a smartphone, may have an ability to periodically estimate its location or position such as via receipt of Global Positioning System (GPS) signals. A mobile device may be in periodic communication with various entities such as a base station for cellular phone service, or via some other type of access point or server, such as to obtain Internet access. A mobile device may also include an accelerometer from which movement information relating to the mobile device may be determined, as well as other sensors that may, for example, determine orientation, location, temperature, altitude, or barometric pressure.

Certain recurring conditions may be present when a user-undertakes certain actions, such as driving home using a particular route after work. Such recurring conditions may be observed or detected and may be utilized to predict or influence user behavior.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
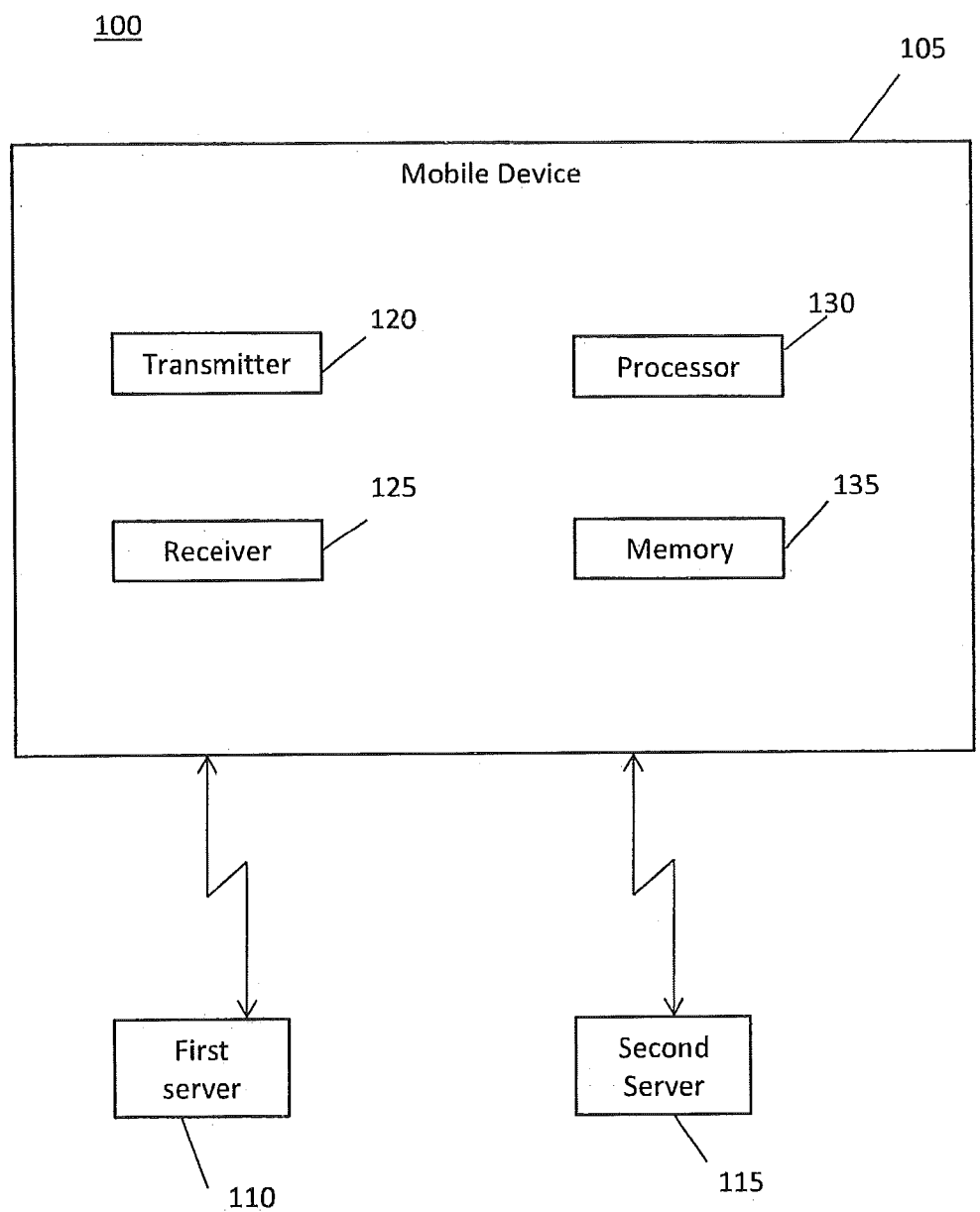
FIG. 1 illustrates a system for communication between a mobile device and a first server and a second server according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

Reference throughout this specification to "one example", "one feature", "an example", or "a feature" means that a particular feature, structure, or characteristic described in connection with the feature or example is included in at least one feature or example of claimed subject matter. Thus, appearances of the phrase "in one example", "an example", "in one feature" or "a feature" in various places throughout this specification are not necessarily all referring to the same feature or example. Furthermore, particular features, structures, or characteristics may be combined in one or more examples or features.

There is a wealth of information collected from users of mobile devices, e.g., on a daily basis. For example, a mobile device, such as a smartphone, may have an ability to periodically estimate its location or position such as via receipt of Global Positioning System (GPS) signals. A mobile device may be in periodic communication with various entities such as a base station for cellular phone service, or via some other type of access point or server, such as to obtain Internet access. The mobile device may maintain a log of its current or past location estimates, or may transmit such information to a networked device, such as a server.

A log or store of current and/or past location estimates for a mobile device may be utilized to make or infer one or more observations about a user of a mobile device. For example, accelerometer or gyroscope sensor data for a user may indicate that the user is running or standing. An "observation," as used herein, may refer to a detectable characteristic of a user. For example, if a mobile device of a user is associated with a particular location estimate at a particular time of day, an observation may be that the user was at the particular location estimate at the particular time of day. An observation may be determined at periodic time intervals, such as every 30 minutes, for example. In an embodiment, an observation may additionally or alternatively be determined if a location estimate for a user has stopped changing, such as if the user has been at a particular location, such as a home location, or work location, for a particular length of time. Observations may be determined based on various activities performed by a user, such as via the user's mobile device. For example, identities of various applications used by the user, such as an email application, a Facebook™ application, or an alarm clock application, to name just a few examples among many, may be observed. A category of an application used may comprise an additional observation. Similarly, times of day at which various applications were used and lengths of time by which the various applications were used may additionally or alternatively be observed. Accelerometer measurements, such as to indicate that a user is or was walking, driving, riding on a train, or jumping, for example, may be observed. A manner in which accelerometer measurements are observed, such as whether the measurements indicate that a user is or was driving particularly aggressively, quickly, or slowly, may be observed. There are potentially unlimited types of observations which may be made about a user of a mobile device, for example. In an embodiment, observations may additionally or alternatively be made about a user that are unrelated to any particular mobile device used by the user, such as an externality.

An "externality" as used herein refers to an event, occurrence, or location external to a computing device, such as a mobile device or a user of the mobile device. For example, an externality may be independent of an action or location of a mobile device or a user of the mobile device. An externality, as used herein, may refer to a presence of a concert event, an event at an enclosed space, weather, traffic, or other news event, to name a few examples.

A mobile device may execute or run one or more applications at a given time. A particular application may monitor or otherwise track various observations made about a user or about the user's mobile device. For example, a mobile device may implement an application comprising an observation engine to monitor whether certain circumstances have been detected, achieved, or otherwise met.

A "circumstance," as used herein, refers to a status or condition indicative of a detection of particular event, condition, or action. For example, a circumstance may be an action performed by a user or on behalf of the user, such as by a mobile device of the user. Examples of a circumstances may include a determination that the user has used a particular rideshare application now or in the past, the user is currently located at a particular concert hall, the user just left a particular big-box store, or the user has visited the same coffee shop for three consecutive days, for example. Additional examples of circumstances are discussed below.

An "observation engine," as used herein, refers to an on-device software development kit (SDK) which detects an occurrence of certain circumstances. For example, an observation engine may be added to or may comprise a portion of an application program. In one particular embodiment, an observation engine may comprise executable code or instructions which, if executed, may notify an application program to which it is integrated or of which otherwise forms a portion, to notify the application program of an existence of certain circumstances or conditions which may be predetermined, predefined, or otherwise specified prior to execution or implementation of the application program. For example, upon detection of certain circumstances, a signal may be generated or a state may otherwise be changed to inform the application of an existence of the circumstances.

A "software development kit" or "SDK," as used herein refers to a code library that is compiled into an application program. An SDK may be added or appended to an application before the application is compiled.

An "application" or "application program," as used here refers to a program or executable code to perform a group of coordinated functions, tasks, or activities, for example. In one embodiment, an application may initially be programmed and then an SDK may be compiled into the application. The application may subsequently be compiled with the SDK and may be made available for installation or download by end users. In one embodiment, an application may be accessed, downloaded, or otherwise retrieved via an application database or "app store," for example.

An "app store," as used herein, refers to a repository from which one or more applications may accessed, downloaded, or otherwise retrieved. In one embodiment, an app store may be accessed via a network, such as the Internet, and an application may be downloaded by an end user for installation on a device of the end user, such as a cellular or smart phone, a computer, such as a desktop or laptop, or any other type of computing device, such as a mobile device or a stationary device.

In one particular example, an observation engine may detect an occurrence of certain circumstances, such as (a) if a device enters a Starbucks on foot during the morning commute; (b) if the device leaves its owner's work location by car during work hours; or (c) if the device is transported into a rock concert at a small venue in Hollywood, Calif.

Circumstances may be defined by application developers using an authoring tool. For example, an authoring tool may be separate from an application program comprising an SDK for implementing an observation engine. In one embodiment, circumstances may be uploaded to or pushed to an observation engine via an over-the-air (OTA)-type of system.

An observation engine may be utilized to make specified circumstances actionable. In an example, an observation engine may make a callback to a developer's application or invoke a particular function if a specific set of circumstances is detected or otherwise met. For example, a developer's application may be executed or run by the same mobile device executing or running an observation engine. A developer's application may perform some type of action in response to receiving a callback from an observation engine. For example, if a developer's application comprises a ride-sharing application, an observation engine may generate and transmit a callback to the ridesharing application if certain circumstances are detected or met, such as a user is exiting a movie theater after having been inside the movie theater for two hours, presumably attending a movie showing. In an example, if the circumstances are detected, the ridesharing application may prompt the user to send a message to hail an automobile ride home.

In an embodiment, a developer's application may determine whether a user's visits to Starbucks™ are common. If so, the developer's application may prompt the user to determine whether the user would like his or her coffee to be pre-ordered through a Starbucks™ Application program interface (API) in the future. In an example where a circumstance comprises any time a mobile device leaves its owner's work location by car during work hours, a developer's application may check for a local food point of interest en route, if, e.g., the egress occurs during lunch hour.

An application or product may be paired with an observation engine to discover a correlation of desired outcomes to circumstances. Alternatively, the observation engine may discover user correlations by itself. Accordingly, a secondary task of an observation engine may be to collect attribution data.

An SDK interface for a mobile device may be idiomatically consistent with a platform on which it operates or sits, such as iOS™ or Android™. An observation engine may leverage default operating system libraries, which are intended to solve overlapping problems, as appropriate. For example, on iOS™, existing Significant Changes and Standard Location services may be utilized instead of custom ones in an embodiment. One goal is to take advantage of code that is relatively continually maintained and improved by a platform developer, such as Apple™.

In accordance with an embodiment, it may be relatively simple and easy to install and configure an observation engine. Such installation may follow a platform's best practices, such as CocoaPods™.

For ease of installation, a footprint may be kept small. For example, a particular ceiling, such as 1 MB or less of code may be utilized to implement an observation engine.

An observation engine may utilize OTA updates to ensure that a latest compatible version of the observation engine is being utilized on a mobile device. By using OTA updates, one may ensure that instances of an observation engine in the field are configured consistently, such as within approximately 24 hours of any update, for example.

An authoring or programming environment to describe or indicate circumstances of interest may be separate from an SDK of an application installed on a user's mobile device. For example, a programmer may remotely describe or indicate circumstances of interest or may remotely determine certain directives such as to indicate whether a particular function is to be invoked at least partially in response to detection of one or more specified circumstances.

An OTA update may transmit or send rules or directives "over the air," such as via a connection to the Internet or another network to the application. Rules or directives may be authored for various different circumstances. Rules or directives may inform a host device of whether and/or when to perform a specified action in response to detection of specified circumstance.

An SDK of an application may collect or gather information or data of interest, may store this information in a log of a memory, and may initiate transmission of the logged information to a database or data store for further analysis, such as by a developer of an application in which the SDK is utilized. An SDK may also inform a host application upon detection of specified circumstances, based on various rules or directives relating to the specified circumstance, so that, e.g., the host application may perform a specified action or invoke a specified function.

In one embodiment, an SDK may determine or make its own decisions in response to detection of specified circumstances. For example, a decision may be based, at least in part, on a machine learning process. Certain benefits may be realized, for example, if directives are updated periodically and an SDK has an ability to make its own decisions regarding responses to detection of specified circumstances.

In one embodiment, directives or rules relating to certain specified circumstances may be periodically transmitted or sent to a mobile device to test or determine which actions in response to detection of the specified circumstances resulted in an interesting response by a user. For example, if a relatively high percentage of users leave feedback in response to a prompting based on detection of specified circumstances, the action of prompting the user to leave feedback may be considered an interesting response, which may be incorporated into future directives, for example.

For example, specified circumstances may relate to a restaurant-finding application. Analysis of logged user responses to prompts based on detection of circumstances may be performed to identify circumstances where a user is more likely to respond to being prompted. One example of a circumstance, would be if a user is at a restaurant, leaving the restaurant, or where the user has been at home at least 20 minutes, but was at a restaurant 3 hours ago. An example response to detection of a user circumstance may be to initiate a pop-up message to ask whether the user would like to review the restaurant and analyze whether the user actually writes a review.

An OTA update may also or alternatively be performed to update a manner in which circumstances are detected. For example, if a user is walking, the user's act of walking may be detected based on a frequency at which the user's phone is moving up and down, such as if the phone is in a user's pocket and can detect whether a pattern of sensor output resembles a human movement such as via a regular periodic fashion. If, however, a similar or the same sensor output may be detected by the user riding on a bike with the phone, the manner in which the circumstances are detected may be updated to distinguish between a user walking and a user riding a bike. An update regarding the manner in which the circumstances are detected may, e.g., be pushed to a user's mobile device via an OTA update.

Radio access may be utilize undesirably large amounts battery power, and may require available service. Accordingly, an observation engine as discussed herein may behave independently of a network connection. In an embodiment where a network connection may be required, an observation engine may utilize intelligent ways to manage or minimize failure.

An observation engine may provide application developers with a degree of latitude regarding tuning across battery consumption, accuracy, and latency, for example. If a developer wants to ship a power-hungry application in an appropriate way (such as a turn-by-turn direction application), an observation engine may be configured to fit such a profile. Conversely, if a developer wants as small of a power usage profile as possible, that goal may also be achieved.

An observation engine may leverage circumstances based on various items, such as (a) activities, such as arriving or leaving; (b) locations, such as whether a user is at a particular category of place; (c) events, such as a type of event occurring where a user is currently located; (d) mobility, such as whether a user is walking or driving; or (e) temporal relationships, such as whether a user is coming, going, how long the user has been there, or a statistical likelihood that the user will leave within the next 5 minutes, and so forth.

A software development kit for an application may require services for: (a) place-attachment, such as to accurately determine where a user is, with a low false positive rate; (b) activity detection, such as low latency and a high accuracy determining of method of transit (for example, this may also encapsulate higher-level activities like "retail shopping" or "exercising"); (c) state, such as the last place where a user was attached and a corresponding dwell time.

An interface may be callback-based, as discussed previously above. A particular model is activity detection (which may encompass both place attachment and event detection). At startup of activity detection, monitoring for particular circumstances may be initiated. If there is a positive hit such that circumstances are detected, the event may be logged, and a developer's application may be alerted to a fact that an event log has a new entry.

FIG. 1 illustrates a system 100 for communication between a mobile device 105 and a first server 110 and a second server 115 according to an embodiment. A user may be associated with mobile device 105. Mobile device 105 may include a transmitter 120, receiver 125, processor 130, and memory 135, to name just a few among many possible components or elements of the mobile device 105. Memory 135 may store instructions executable by processor 130 and may also store other information relating to mobile device 105, such as an identifier (ID) of the mobile device 105 or an estimated location of the mobile device 105. For example, processor 130 may estimate a location of mobile device 105. For example, an estimated location of the mobile device 105 may include latitude/longitude coordinates for the mobile device 105 or coordinates based on some other coordinate system or convention.

An application comprising an SDK may estimate a location of a mobile device on which the application is run by itself (client-side). By having an ability to estimate a location of a mobile device an application may be reasonably insulated against network failures, may operate in a more battery-efficient manner (e.g., by not pinging location servers on a periodic or regular basis), and may also behave intelligently with a relatively high level of privacy (e.g., because a location estimate for the mobile device does not have to be sent to a server). An application may, however, communicate with a "tiling server" or a "map server," such that data may be organized and delivered in relation to a particular geographic area. A tiling server may, e.g., provide tiles of map information or data for a surrounding area, which may comprise information or data that an application may utilize to estimate a current location of mobile device running or executing the application. Map tiles may be stored in a cache within an application, comprising a data representation of things or items around the mobile device at the current time. If the mobile device is determined to be likely to leave a particular area for which it has enough map data to operate on its own, the application may retrieve tiles for new areas into which the mobile device is likely to be moved.

Transmitter 120 may transmit one or more signals. For example, transmitter 120 may transmit one or more signals to first server 110 or second server 115. In an embodiment, an observation engine application may be obtained from first server 110, and a developer's application may be obtained from second server 115. In some embodiments, more or fewer than two servers may be utilized. Receiver 125 may receive one or more signals, such as one or more signals received via a communications network, from first server 110 or second server 115.

Figure 2:
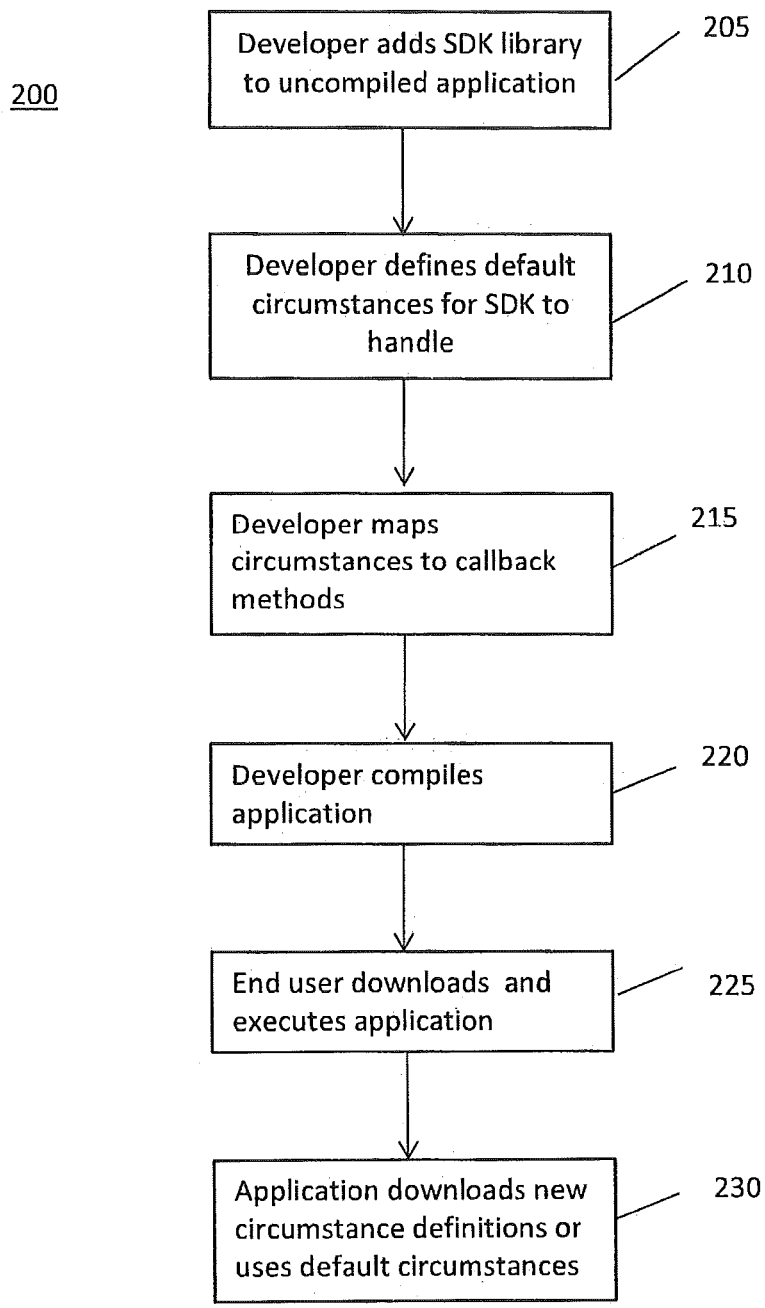
FIG. 2 illustrates a process for an application developer to specify circumstances to be detected on a mobile device of a user according to an embodiment.

FIG. 2 illustrates a process 200 for an application developer to configure or specify circumstances to detect by an SDK of an application of a mobile device according to an embodiment. Embodiments in accordance with claimed subject matter may include all of, less than, or more than blocks 205-230. Also, the order of blocks 205-230 is merely an example order.

At operation 205, a software developer may add an SDK library to an uncompiled application. At operation 210, a software developer may define default circumstances for an SDK to handle, process, or otherwise detect. Operation 210 may be performed via programming code or across an API provisioned, e.g., by a remote server or using a user interface with access to the API.

At operation 215, a software developer may associate certain circumstances to various callback methods. For example, a software developer may indicate directives for responding to detection of one or more specified circumstances. A directive may, for example, indicate that a callback function is to be invoked upon detection of one or more specified circumstances. A "callback," or "callback function," as used herein, refers to a piece of executable code that is passed as an argument to other code. For example, a callback may be used to "call back" or invoke execution of an argument at some specified or otherwise appropriate time. In one example, a callback may invoke a particular function. For example, if a specified circumstance is detected which indicates that a user has exited a concert, a callback may invoke a function to hail a taxi, such as via a taxi application or ridesharing application. A callback may invoke a function within the same application or may initiate execution of a different application, such as a ridesharing application as discussed above. In another example, if certain circumstances are detected, such as those which indicate that a user was at a restaurant three hours ago and has now been at home for the past 30 minutes, a function may be invoked to prompt the user to write a review for the restaurant. In another example, if detected circumstances indicate that a user has arrived at a particular restaurant for a dinner reservation, a callback may invoke a function to notify other parties to the dinner reservation, such as via text message or by checking the user into the restaurant on a social media application, so as to indicate that the user has arrived at the restaurant.

Referring again to FIG. 2, a software developer may compile an application at operation 220. A compiled application may be uploaded to an app store, server, database, or some other location from which the compiled application may be downloaded, retrieved, or otherwise accessed by an end user. At operation 225, an end user may download and execute or otherwise run a compiled application. At operation 230, an application may download new or updated circumstance definitions or may use default circumstances. For example, circumstance definitions may be updated over time, such as periodically or otherwise, and an application may download new or updated circumstance definitions.

Some circumstances are user-dependent and some are not. For example, some circumstances may be determined based on particular actions of a user, such as whether the user is within a certain location or point of interest, or whether the user is performing a particular activity, to name just a couple of examples. Some circumstances are independent of a user, such as certain weather conditions, occurrence of certain news or sporting events, or detection of certain holidays, to name just a few examples. Some circumstances may be detected based on information provided by an operating system executing program code for an application or otherwise running the application. For example, an operating system may process raw sensor data and make its own observations. For example, an operating system may independently determine that the user has stopped somewhere for a sufficiently long time to be reasonably noticeable, such as where raw sensor data comprises accelerometer readings taken every $\frac{1}{10}$th of a second. Similarly, an operating system may observe that a user's mobile device has moved to a different cell tower service area. An observation engine as discussed herein may have access to various types of input, which may be leveraged to make its own observations.

In another example, an observation engine may pull various types of information or data or properties from an operating system of the mobile device. For example, if the mobile device has a weather application, an operating system may pull or otherwise acquire current or forecast weather conditions, which may be pushed to an observation engine, as discussed herein. Similarly, an operating system may determine whether a user has texted or made telephone calls to particular specified number, person, or place or point of interest and may push this information to an observation engine.

An "operating system property," as used herein refers to data or information available from an operating system. For example, one or more sensors of a mobile may accessed through the operating system. Accordingly, an operating system property may include data or information which may be accessed via an operating system, including both (a) data or information output by the operating system, and (b) data or information accessible via, even if not necessarily output by, the operating system. An operating system property may include, e.g., information available from or through the operating system, including information from various sensors as well as attributes of the operating system or device such as type, version, memory, or available battery capacity, to name just a few among many examples.

An example of information or data which may be pushed to an observation engine may include a scenario in which an operating system determine that a user's mobile device has switched cell towers providing service and that this is (Apple's terms) considered a "Significant Change" in accordance with Apple™'s iPhone Operating System (IOS). For example, an operating system may notify the observation engine that a change in a service cell tower has occurred. Such a notification may include a new location estimate or coordinates such as latitude and longitude. The observation engine may utilize this information or data (and may likewise request some other information or data) to estimate a current circumstance. This process may, for example, comprise a relatively continuous feed of events being pushed to the observation engine.

An example of information or data which may be pulled by an observation engine may include a scenario in which the observation engine has been running a timer, and determined that it has not checked to see whether anything has changed within a particular time period, such as within the last five minutes. An observation engine may pull or request, from the operating system, the current latitude/longitude or altitude, to name just a couple of examples, and may use this information or data to estimate its current circumstance.

Examples of various circumstances and desired responses or actions are shown below in Chart A.

Chart A

| Circumstance | Desired Response or Action |
| --- | --- |
| User is in the parking lot of a big-box store | Let user know about deals available at that specific big-box store location |
| User has just left a big-box store | Prompt user to take a survey on his or her shopping experience |
| User visits the same coffee shop three days in a row | Ask if user wants to pre-order a coffee for tomorrow's commute |
| User is in traffic and has deviated from a normal route to work | Ask if user wants coffee from an alternative Starbucks he or she will soon pass |
| User is soon leaving a concert that he or she travelled to by ride share | Prompt to call a ride home |

As shown in Chart A, various examples of circumstances and desired responses or actions include (a) if user is in the parking lot of a big-box store, then let user know about deals available at that specific big-box store location; (b) if user has just left a big-box store, then prompt user to take a survey on his or her shopping experience; (c) if user visits the same coffee shop three days in a row, then ask if user wants to pre-order a coffee for tomorrow's commute; (d) if user is in traffic and has deviated from a normal route to work, then ask if user wants coffee from an alternative Starbucks he or she will soon pass; and (e) if user is soon leaving a concert that he or she travelled to by ride share, then prompt to call a ride home. A developer may choose the circumstances and desired responses or actions at operation 210 by, e.g., transmitting a message to be received by or uploaded to an observation engine of an application on the user's mobile device at operation 215.

Figure 3:
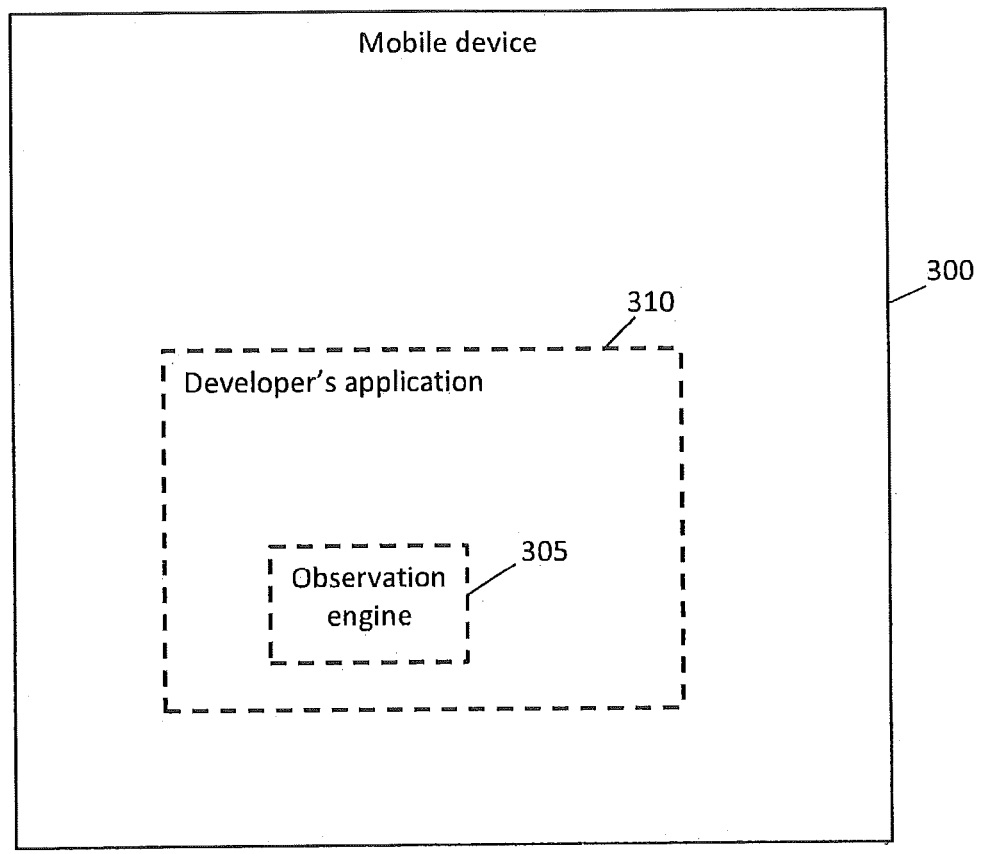
FIG. 3 illustrates a mobile device in accordance with an embodiment.

FIG. 3 illustrates a mobile device 300 in accordance with an embodiment. As shown, mobile device 300 may execute or run, such as via a processor, a developer's application 310. The developer's application 310 may include an observation engine 305. As discussed previously above, an SDK comprising observation engine 305 may be appended or otherwise added to developer's application 310.

Figure 4:
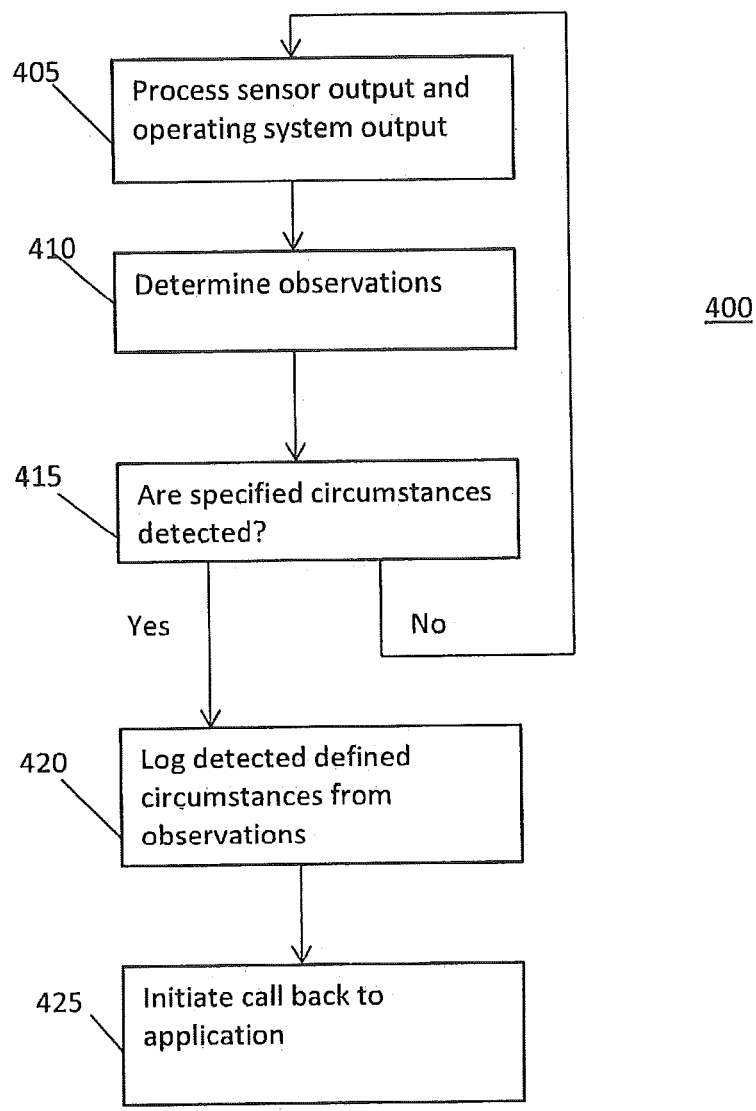
FIG. 4 illustrates a process for an observation engine to monitor a mobile device to detect an occurrence of one or more specified circumstances according to an embodiment.

FIG. 4 illustrates a process 400 for an observation engine to monitor a mobile device to detect an occurrence of one or more specified circumstances according to an embodiment. Embodiments in accordance with claimed subject matter may include all of, less than, or more than blocks 405-425. Also, the order of blocks 405-425 is merely an example order.

At operation 405, sensor output such as measurements or other data, such as sensors indicative of movement of a mobile device, and operating system properties may be monitored and processed, as previously discussed. Sensor output may include, for example, a reading or measurement from an accelerometer or a location estimate such as geographical coordinates, which may include latitude/longitude coordinates. Operating system properties may include information pushed from an operating system to an observation engine, or pulled by the observation engine from the operating system, as previously discussed above. At operation 410, observations may be determined based, at least in part, on the processed sensor output and the operating system properties. At operation 415, a determination may be made as to whether specified or defined circumstances have been detected based, at least in part, on the observations. As discussed above, circumstances may be specified, defined, or otherwise identified a priori by a software developer. If circumstances are not detected at operation 415, then processing returns to operation 405. However, if circumstances are detected at operation 415, then the detected circumstances may be stored in a log in a memory or other device storage along with a time of detection, for example, at operation 420. Information stored in a log may periodically be transmitted to a server or other device for analysis, such as by a developer of the application. For example, directives indicative of which particular callbacks or other response to perform at least partially in response to detection of circumstance may be modified by an application developer based, at least in part, on information from a log.

At operation 425, a callback may be initiated to invoke a particular function. For example, if a developer has a ridesharing application and detected circumstances or conditions indicate that a user is leaving an event and may be ready for a ride home, a callback may be initiated to a developer's ridesharing application.

As discussed above, circumstances may be identified or selected by an application developer such as by the developer uploading or otherwise providing circumstance definitions such as via a string. A string made for circumstances may comprise an arbitrary identifier, word, tag, or other set of bytes that is defined by a developer when a circumstances rule is created. A circumstances rule need not be unique, so that multiple rules may be strung together to return a uniform result.

As discussed herein, a mobile device or some other type of device may execute or run some operating system. Sensor data may be obtained by an observation engine from the operating system, and the sensor data may be processed to determine one or more "observations". Such observations may be processed to determine whether a specified circumstance has been met and, if so, this determination may be noted in an historical log, such as in a memory. In an embodiment, there may be a minimum reason to alert a user, such as if the user is determined to have certain latitude/ longitude geographical coordinates which correspond to a particular place or point of interest, such as a particular Starbucks™.

In an embodiment, a service may be provided in which a hosting application may query to determine whether a user of a mobile device has fulfilled a specified circumstance or set of circumstances, for example.

Tables B-F, as shown below, illustrate various information for circumstances, such as category, title or name, and definitions for the circumstances.

Table B illustrates circumstances based on a user's activity. As shown below, "Arrived" may indicate that a user is at a particular place. "Departed" may indicate that a user has left a particular place. "Likely arriving soon" may indicate that it is predicted that user will be arriving at a place "soon," where this prediction may be based on speed, start time for a known event, and that a user is at a particular place. "Likely departing soon" may indicate that it is predicted that user will be leaving a place "soon," where this prediction may be based on items such as average dwell time, speed, and closing hours. "Near" may require a tuning parameter such as "walkable", "drivable", or 400 m. "Likely passing soon" may be based on speed, direction, and known path. "Deviating from common route" may represent a deviation from a user's regular commuting path, based on speed, and direction.

TABLE B

| Category | Title/name | Definition |
| --- | --- | --- |
| Activity | Arrived | User is at a place |
| | Departed | User has left a place |
| | Likely arriving soon | It is predicted that user will be arriving at a place "soon". Prediction may be based on speed, start time for a known event, etc. |
| | Likely departing soon | It is predicted that user will be leaving at a place "soon". Prediction may be based on average dwell time, speed, closing hours, etc. |
| | Near | May require a tuning parameter like "walkable", "drivable", 400 m, etc. |
| | Likely Passing Soon | May be based on speed, direction, and known path |
| | Deviating from common route | If tracking things such as user's regular commuting path, this would represent a deviation from that path. |

Table C illustrates circumstances based on a user's location. As shown below, "Specific POI" may indicate that a user is at a particular place based on an ID. "POI by category" may indicate that a user in in a place identified by a category. "Chain POI" may indicate that is place is identified by a particular chain ID. "In common AOA" may indicate that a user is at a place determined based on information from a source of information about a device user (hereinafter, "Audience Source"), such as, e.g., a server, memory, or database which may store information about a known or predicted audience of a particular user. "Home" may indicated that a user is at a location determined based on information from Audience Source. "Work" may indicated that a user is at a location determined based on information from Audience Source.

TABLE C

| Category | Title/name | Definition |
| --- | --- | --- |
| Location | Specific POI | Place verified by ID |
| | POI by category | Place identified by a category |

TABLE C-continued

| Category | Title/name | Definition |
| --- | --- | --- |
| | Chain POI | Place identified by verified chain ID |
| | In Common AOA | Based on information from Audience Source |
| | Home | Based on information from Audience Source |
| | Work | Based on information from Audience Source |

Table D illustrates circumstances based on location conditions (potentially overlapping conditions present). As shown below, "Is (not) open now" may indicate that a place or point of interest, such as a business or venue, is not open and may be determined from an operating hours flag from a source of information about or places or points of interest (hereinafter, "Places of Interest Source"), such as, e.g., a server, memory, or database which may store information about a known or predicted information about a location, such as a venue or structure. "Is currently hosting an event" may indicate that a place or point of interest is currently hosting an event, such as a concert or meeting, for example, and may be determined from a source of information about events (hereinafter, "Event Source"), such as, e.g., a server, memory, or database which may store information about a known or predicted information about an event. "Is currently hosting an event of a specified category" may indicate whether a place or point of interest is currently hosting an event, such as a private party, for example, and may be determined from information from information from Event Source. "Any place condition (e.g., rating, placerank, cost, etc.)" may indicate a presence of a particular rating, such as a 5-star rating for a restaurant or place of interest, for example, and may be determined from information from a Places of Interest Source.

TABLE D

| Category | Title/name | Definition |
| --- | --- | --- |
| Location conditions (potentially overlapping conditions present) | Is (not) open now | Using operating hours flag from Places of Interest Source |
| | Is currently hosting an event | From information from Event Source |
| | Is currently hosting an event of a specified category | From information from Event Source |
| | Any place condition (e.g., rating, placerank, cost, etc.) | From information from Places of Interest Source |

Table E illustrates circumstances based on mobility conditions (this may comprise an array of potentially overlapped conditions). As shown below, "Walking" may be determined based on sensor measurements from a mobile device of a user. Sensor measurements may, e.g., include measurements which may indicate movement, such as measurements from an accelerometer or gyroscope or location estimates for a mobile device and/or a user of the mobile device or some other device, such as Global Positioning System (GPS) coordinates. "In car" may be determined based on sensor measurements. "Flying" may be determined based on sensor measurements. "On bus" may be determined based on sensor measurements. "On subway/train" may be determined based on sensor measurements. "On bike" may be determined based on sensor measurements. "In traffic" may be determined based on sensor measurements such as location estimates or accelerometer data for a mobile device indicating movement in fits and spurts. "Stopped" may be determined based on sensor measurements such as location estimates or accelerometer data. "Running" may be determined based on sensor measurements. "In elevator" may be determined based on sensor measurements. "Meandering" may be determined based on directionless walking in fits and spurts that resembles retail shopping.

TABLE E

| Category | Title/name | Definition |
|---|---|---|
| Mobility conditions (this is an array of potentially overlapped conditions) | Walking | Based on sensor measurements |
| | In car | Based on sensor measurements |
| | Flying | Based on sensor measurements |
| | On bus | Based on sensor measurements |
| | On subway/train | Based on sensor measurements |
| | On bike | Based on sensor measurements |
| | In traffic | In car, moving in fits and spurts |
| | Stopped | Not moving |
| | Running | Based on sensor measurements |
| | In elevator | Based on sensor measurements |
| | Meandering | Directionless walking in fits and spurts that resembles retail shopping. |

Table F illustrates circumstances based on temporal conditions (array of potential overlaps). As shown below, "Date/time range" may mean that the time is within a specified stated/end date and/or time. "Recurring day of week" may mean that the day is a specified day of the week, such as "Wednesday." "Recurring day of month" may mean that the day is a specified day of the month, such as "$1^{st}$ of every month." "Recurring day of day" may mean that the time of day is a specified time of day, such as "13:00." "Rush hour" may mean that the time of day is within a certain loose estimate, such as 7-9 AM or 4-6 PM. "Daylight" may mean that there is daylight and may be determined based on local information based on latitude/longitude coordinates. "Exceeds specified dwell time" may mean that the user has been in same location for greater than a time threshold.

TABLE F

| Category | Title/name | Definition |
|---|---|---|
| Temporal conditions (array of potential overlaps) | Date/time range | Between a specified stated/end date and time |
| | Recurring day of week | E.g., "Wednesdays" |
| | Recurring day of month | E.g., "$1^{st}$ of every month" |
| | Recurring time of day | E.g., "13:00" |
| | Rush hour | Loose estimate, e.g., 7-9AM, 4-6PM |
| | Daylight | Based on local. Plenty of libraries for determining based on lat/long coordinates |
| | Exceeds specified dwell time | e.g., user has been in same location for greater than a time threshold |

An observation engine of an application may monitor or maintain a current or running log of activities, visitations, and overall circumstances and corresponding times of day at which the circumstances are observed.

As discussed above, a circumstance may indicate that a user is near, arrives at, or departs from a specified place or event. Places may include specific places (e.g., Madison Square Garden, LAX); Categories of places (e.g., all Starbucks, sports bars, shopping malls); Relative to the user (e.g., home, work, commonly visited places); or Places hosting events (e.g., CES, Lakers games, concerts), to name just a few examples. A circumstance may also indicate that a user has changed activity, such as being on foot, meandering, in a car, on a plane, on a train, on a bus, on a bike, or in traffic, to name just a few examples.

An observation engine may observe various combinations of the above, such as (a) in a car AND departing from work; (b) driving OR on a bus AND in traffic; or (c) is NOT at home, for example.

An observation engine may use machine learning to process a wide variety of signals and interpret where users are and what they are doing in the most meaningful way. As an observation engine processes more information or data, a model may continue to improve. If a geo-coordinate indicates that a user is at a bar, an observation engine may interpret that the user will soon be leaving the bar and is likely looking for a cab.

An observation engine may have a relatively tight integration with a mobile device so that signals may be acquired or gather in an efficient manner. A client-side machine learning engine may assess a location. An observation engine may utilize accelerometer activity detection. Over-the-air updates to an observation engine may assist in power management, privacy configuration, and machine-learning models.

If a circumstance is met or detected, a developer's application may be notified with a call back. Such a call back may include a string identifying a detected circumstance, as well as an object containing all of the various information or meta-data (e.g., the activity, location, etc.) and a time at which the circumstance was detected (such as an epoch time, or seconds or time since startup, for example).

A goal of an application developer may be to use OTA updates to switch between strategies for detection. An OTA system may contain a configuration comprising: (a) tuning around collection of information (how often to poll, what kind of location services to use, what other services to poll, etc.); (b) tuning around privacy (what should and shouldn't be collected, or when a do-not-track flag is to be applied to data that is collected.); (c) Configuration information or data for sensor measurements indicative of certain types of movements or activities; (d) Configuration information or data for a place-attachment; and/or (e) Configuration information or data for circumstance rules engine.

An observation engine may have a default configuration bundled with it when deployed to an app. This default configuration may be defined by a developer. A default configuration may comprise a blanket configuration, such as tuned for an application and an operating system.

If a developer's application is initiated or otherwise starts executing or running for the first time on a mobile device, the developer's application may request configuration information such as a configuration file via a configuration API. A configuration API request may provide certain parameters such as an Operating System (OS), OS version number, cellular carrier name and country code, user Identifier (Id), locality, language, and API key. A web service may, for example, return or otherwise provide an appropriate configuration object, such as acquired from a database or server. On subsequent startups, a developer application may determine whether it has been more than a certain amount of time, such as 24 hours, since the previous configuration object was received. If so, a developer's application may check to see if a newer configuration is available and, if so, get it.

A persistent device ID may be utilized to for database requests for information such as information relating to an audience database. This ID may be used to tie together requests so that long-term trends may be observed to help improve a quality of an observation engine.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

As used herein, the term "advertisement" and/or similar terms is meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:
   processing, by one or more processors of a mobile device, at least one of: sensor output from one or more sensors and at least one operating system property of an operating system of the mobile device;
   determining, by the one or more processors, one or more observations from the at least one of the sensor output and the at least one operating system property;
   determining, by the one or more processors, whether one or more specified circumstances are detected within the one or more observations, the one or more specified circumstances comprising a prediction of a future user activity based on the one or more observations;
   receiving, by the one or more processors, one or more directives related to the one or more specified circumstances to determine which actions performed by the mobile device in response to the one or more specified circumstances resulted in a user response, wherein the one or more directives are based at least in part upon information from a log of user responses to one more prompts; and
   generating, by the one more processors, one or more binary digital signals to indicate that an application is to invoke a specified function of the mobile device, at least partially in response to detection of the one or more specified circumstances and the one or more directives, wherein the one or more specified circumstances comprises an activity, location, one or more location conditions, one or more mobility conditions, or one or more temporal conditions.

2. The method of claim 1, further comprising receiving, from an application developer, a set of one or more specified circumstances.

3. The method of claim 1, wherein the application comprises a software development kit comprising an observation engine.

4. The method of claim 3, wherein the at least one operating system property is pushed from the operating system to the observation engine or pulled by the observation engine from the operating system.

5. The method of claim 1, wherein the at least one sensor output comprises an accelerometer measurement or estimated geographical coordinates.

6. The method of claim 1, further comprising receiving an Over the Air message to update parameters or directives of the one or more specified circumstances to be detected.

7. The method of claim 1, further comprising determining whether a user of the mobile device has fulfilled a specified circumstance or set of circumstances in response to a query from the application.

8. A mobile device, comprising:
   a receiver to receive one or more electronic signals from an electronic communication network;
   a memory to store state information comprising one or more electronic signals; and
   a processor to:
      process at least one of: sensor output from one or more sensors and at least one operating system property of an operating system of the mobile device;
      determine one or more observations from the at least one of the sensor output and the at least one operating system property;
      determine whether one or more specified circumstances are detected within the one or more observations, the one or more specified circumstances comprising a prediction of a future user activity based on the one or more observations;
      receiving, by the one or more processors, one or more directives related to the one or more specified circumstances to determine which actions performed by the mobile device in response to the one or more specified circumstances resulted in a user response, wherein the one or more directives are based at least in part upon information from a log of user responses to one more prompts; and
      generate one or more binary digital signals to indicate that an application is to invoke a specified function, of the mobile device, at least partially in response to detection of the one or more specified circumstances and the one or more directives, wherein the one or more specified circumstances comprises an activity, location, one or more location conditions, one or more mobility conditions, or one or more temporal conditions.

9. The mobile device of claim 8, wherein the processor is to process a set of one or more specified circumstances received from an application developer.

10. The mobile device of claim 8, wherein the application comprises a software development kit comprising an observation engine.

11. The mobile device of claim 10, wherein the at least one operating system property is pushed from the operating system to the observation engine or pulled by the observation engine from the operating system.

12. The mobile device of claim 8, wherein the at least one sensor output comprises an accelerometer measurement or estimated geographical coordinates.

13. The mobile device of claim 8, wherein the processor is to further process a received Over the Air message to update parameters or directives of the one or more specified circumstances to be detected.

14. The mobile device of claim 8, wherein the processor is to further determine whether a user of the mobile device has fulfilled a specified circumstance or set of circumstances in response to a query from the application.

15. An article, comprising:
a non-transitory storage medium comprising machine-readable instructions executable by a special purpose computing apparatus to:
process at least one of: sensor output from one or more sensors and at least one operating system property of an operating system of the mobile device;
determine one or more observations from the at least one of the sensor output and the at least one operating system property;
determine whether one or more specified circumstances are detected within the one or more observations, the one or more specified circumstances comprising a prediction of a future user activity based on the one or more observations;
receiving, by the one or more processors, one or more directives related to the one or more specified circumstances to determine which actions performed by the mobile device in response to the one or more specified circumstances resulted in a user response, wherein the one or more directives are based at least in part upon information from a log of user responses to one more prompts; and
generate one or more binary digital signals to indicate that an application is to invoke a specified function, of the mobile device, at least partially in response to detection of the one or more specified circumstances and the one or more directives, wherein the one or more specified circumstances comprises an activity, location, one or more location conditions, one or more mobility conditions, or one or more temporal conditions.

16. The article of claim 15, wherein the machine-readable instructions are further executable by the special purpose computing apparatus to process a set of one or more specified circumstances received from an application developer.

17. The article of claim 15, wherein the application comprises a software development kit comprising an observation engine.

18. The article of claim 15, wherein the at least one sensor output comprises an accelerometer measurement or estimated geographical coordinates.

19. The article of claim 15, wherein the machine-readable instructions are further executable by the special purpose computing apparatus to process a received Over the Air message to update parameters or directives of the one or more specified circumstances to be detected.

20. The article of claim 15, further comprising determining whether a user of the mobile device has fulfilled a specified circumstance or set of circumstances in response to a query from the application.

\* \* \* \* \*